Jan. 4, 1944.    W. R. TUCKER    2,338,691
MOLTEN METAL FOR TEMPERATURE CONTROL
Original Filed Dec. 18, 1939    2 Sheets-Sheet 1
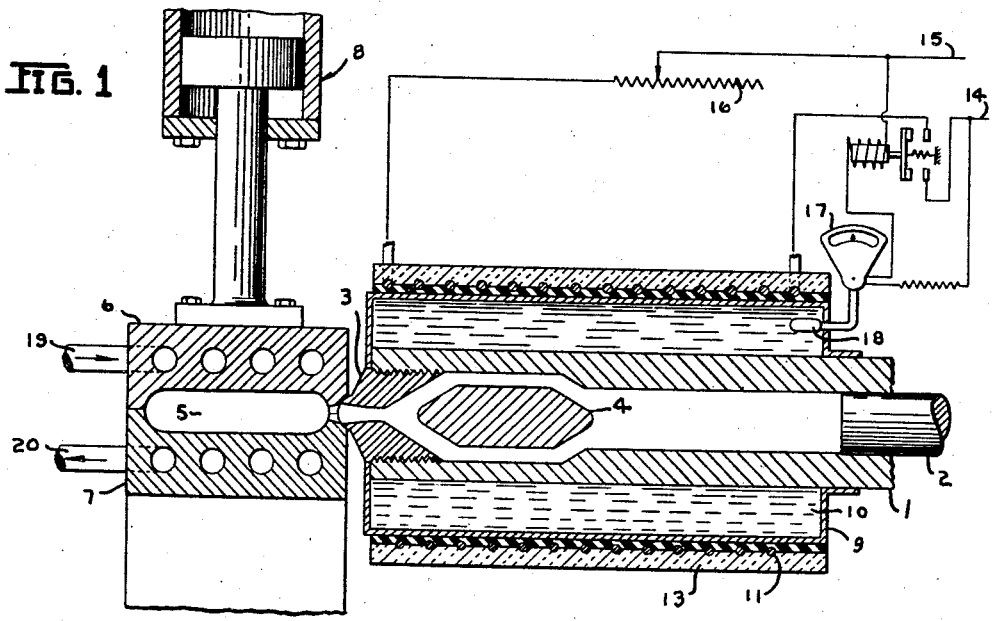
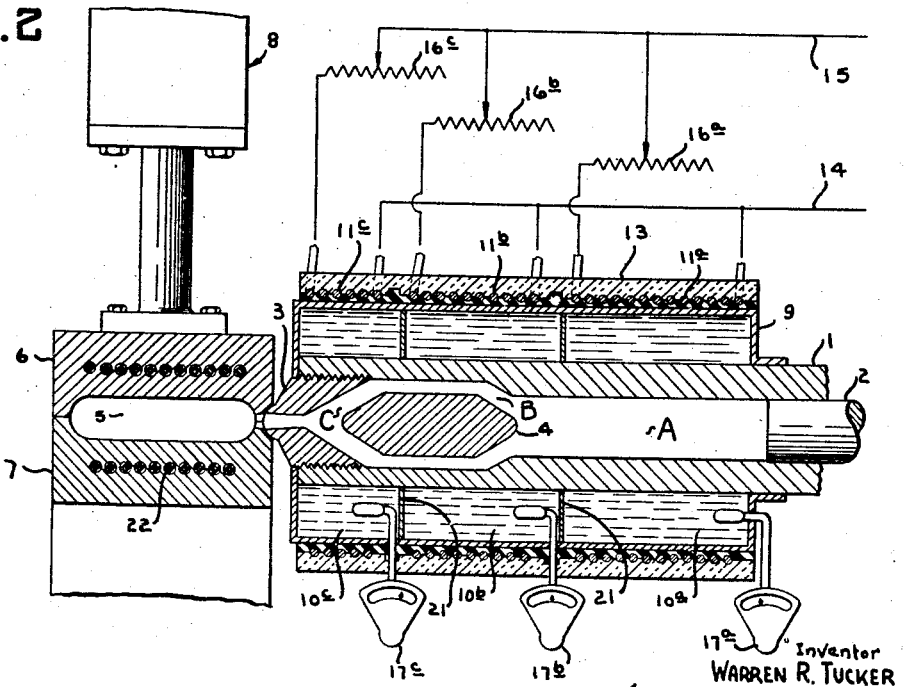
Inventor
WARREN R. TUCKER
by
Attorneys

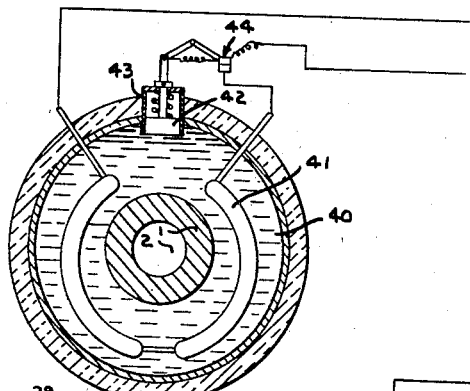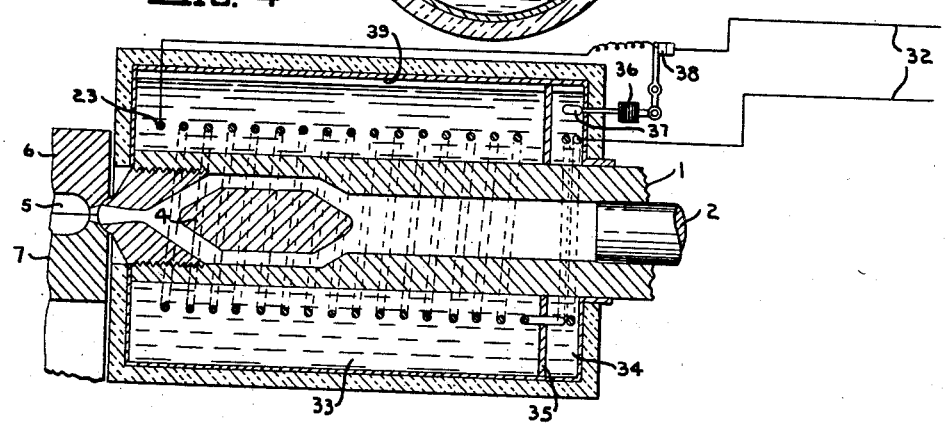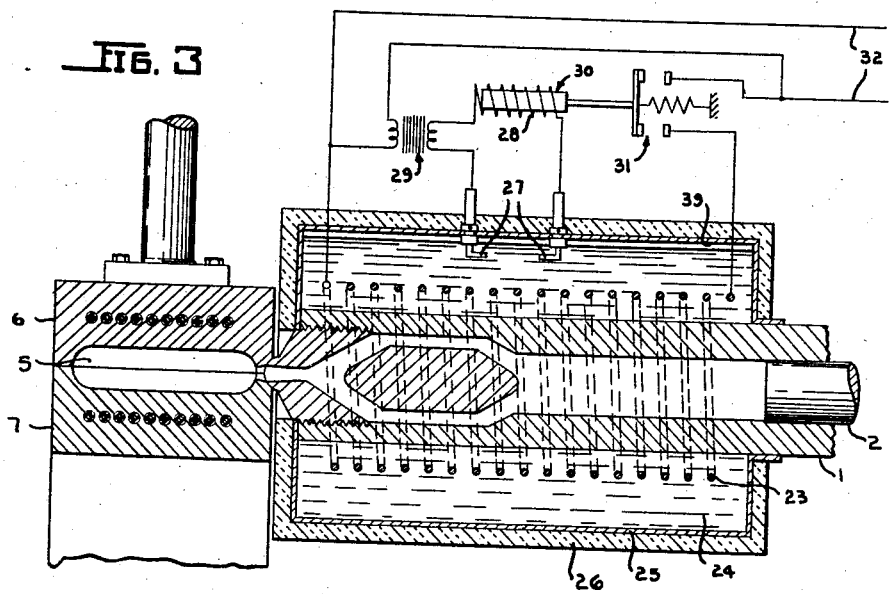

Patented Jan. 4, 1944

2,338,691

UNITED STATES PATENT OFFICE 2,338,691

MOLTEN METAL FOR TEMPERATURE CONTROL

Warren R. Tucker, Dayton, Ohio, assignor to The Hydraulic Development Corp. Inc., Wilmington, Del., a corporation of Delaware Original application December 18, 1939, Serial No. 309,797. Divided and this application February 26, 1941, Serial No. 380,697

11 Claims. (Cl. 18—30)

This invention relates to injection molding and to apparatus and a method for carrying out injection molding in which the temperature of the plastic material is more accurately controlled. The invention may be used in the injection molding of either thermo-setting or thermoplastic resins, but is particularly adaptable to the molding of thermo-setting materials.

Heretofore, it has been more or less common to heat the material in the injection cylinder by electric heating means, or the circulation of a heated fluid around the injection cylinder, whereby the granular non-fluent material is gradually heated up to the injectable state before it reaches the injection nozzle and in this fluent state is injected into the mold cavity. A popular practice has been to heat the injection cylinder with induction heat and to control the temperature of the cylinder wall by a suitable thermostat. This method is disadvantageous since it is impossible to impart an absolutely uniform temperature to the cylinder wall as this temperature fluctuates as much as 4° or 5°. The result is that the temperature of the fluent material injected into the mold fluctuates several degrees. This is disadvantageous since the temperature of fluency of the commonly employed plastic materials is very critical.

My invention substantially eliminates fluctuation in the temperature of the injected material. This constancy of temperature is especially important in the case of thermo-setting materials because, if they are heated above a certain critical temperature for any sustained length of time, an irreversible reaction takes place, reducing their capability of being rendered fluent and injectable. My invention overcomes these disadvantages of the prior art practices by providing a uniform temperature in the injection cylinder. While the invention relates particularly to the maintenance of a uniform temperature in the injection cylinder of an injection molding machine, the principles thereof may, if desired, be applied in the maintenance of a uniform temperature in other portions of the injection molding machine, such as in a preheating chamber or in the mold halves.

The principal object of the invention is to hold the temperature in a portion of the injection molding machine at a uniform and constant level at which the material will be rendered or maintained fluent.

Another object of the invention is to maintain the temperature of a thermo-setting resin uniformly at a point below the critical temperature of the resin, and to inject the resin thus rendered fluent into a mold in which it is raised to or above the critical setting point of the resin.

Still another object is to provide a progressively increasing temperature in a portion of the injection molding machine whereby the temperature in different stages is completely uniform and is progressively increased as the plastic moves forward towards the mold.

Still other objects will more fully hereinafter appear.

This is a division of application Serial No. 309,797, filed December 18, 1939.

In the accompanying drawings:

Figure 1 is a vertical sectional view of one form of an apparatus embodying the principles of the present invention.

Figure 2 is a similar view of another form of apparatus embodying the principles of the present invention and in which the temperature of the injection cylinder is progressively increased to a point below the critical setting point of the plastic, and is then injected into the mold in which it is raised to a point above the critical setting point.

Figure 3 is a similar view of another form of apparatus embodying the principles of the present invention and in which the fusion bath is electrically heated by a spiral immersion heater disposed in the bath, the bath being composed of a material which is a non-conductor of electricity when solid and a conductor of electricity when molten, electrical contacts being disposed in the bath and operative to maintain the bath at the melting point by maintaining a mixture of molten and solid bath material in intimate contact with one another; the electrical control mechanism is shown diagrammatically.

Figure 4 is a similar view but showing another method of maintaining the bath material at the temperature at which change of phase from the solid state occurs; in this form of the invention the bath material is formed into two zones, the minor zone being disposed around the rear portion of the injection cylinder and being maintained at a temperature slightly above the melting point or temperature of change of phase, and the main body of the bath material being maintained at the melting point and near the point where it is all molten; the control portion of the bath at the rear thermostatically controls the application of heat to the whole body of fusion material or the like.

Figure 5 is a transverse vertical section through an injection cylinder equipped with a fusion bath and with still other means for maintaining the bath at the melting point; in this view, the expansion of the fusion material upon attaining the molten state is utilized to control the application of electrical energy to the heating element in the bath; the heating element is shown formed and disposed in such manner as to promote circulation of the bath material.

My invention involves the utilization of a bath of normally solid material at a change of phase in a jacket surrounding the portion of the injection machine to be heated as an accurate means for controlling the temperature in that portion of the injection molding machine. As the fusion material for the bath, I may use metals having a melting point corresponding substantially to the temperature to be maintained in the portion of the machine in question. However, I may use other materials than metals which have a constant or fixed melting point and which are adapted to be held at the melting point for prolonged periods of time and which may be melted and solidified indefinitely. As an example of such other materials, I may use pure metals, chemical compounds, and eutectic mixtures, all of which melt and freeze at a constant temperature. For example, I may use sulphur, naphthalene, benzophenone, and certain salts which have the desired melting point such as, for example, potassium nitrate having a melting point of 337° C., a 45-55 mixture of sodium nitrate and potassium nitrate, which has a melting point of 218° C., or a 55-45 mixture of sodium nitrate and sodium nitrite which has a melting point of 221° C. As an example of still other materials which may be employed, I may under certain circumstances make use of the transition or cryohydric points of crystalline hydrates, where this transformation temperature is sufficiently high, this being another example of control materials having non-variant points and comprising a solid and a liquid in admixture at the transition temperature. As examples of suitable alloys which may be employed, there may be mentioned an alloy consisting of equal weights of lead and tin, preferably with the addition of 0.1% of cadmium to improve the fluidity of the alloy, relatively low melting point alloys of bismuth, tin, lead and cadmium, such as those enumerated under the heading "Fusible metals" in the book, Campbell's "List of Alloys," 1930, page 52. Lead may be employed where a temperature of 327° is desired. An alloy of 30% lead and 70% tin may be used where a temperature of 183° C. is employed. In addition to the foregoing alloys, the fusible alloys set forth on page 555 of the "Handbook of Chemistry," by Lange, 1924, or on page 488 of "Product Engineering," volume 10 (Nov. 1939), may be used. It will be understood that the fusible or like material is selected which has a melting or transformation temperature corresponding to that which it is desired to maintain in the injection molding machine heating chamber.

The fusible or like material is placed in a jacket surrounding the heating chamber. This jacket is provided with heating means of the usual type which has been heretofore employed directly around the heating chamber. This heating means may take the form of electrical resistance elements, or heating passageways through which a heated fluid such as hot oil is directed. Since the purpose of the present invention is to avoid the fluctuation in temperature of a heated fluid, it is usually preferred to employ an electric heating element at this point, the electric heating element being controlled by a suitable rheostat or other controlling means. If desired, a pyrometer which is adapted to indicate and control the temperature of the fusible or like material may be used. There may be provided thermostatic means operating in response to the temperature of the bath material or to the temperature in the heating chamber, whereby the electric heating element is automatically energized or deenergized to maintain the proper temperature and to compensate for the abstraction of heat from the heating chamber by the varied and non-uniform amounts of plastic material passed through the heating chamber.

By reason of the provision of a relatively large quantity of fusible or like material, which is maintained at its melting point and which ordinarily has a high latent heat of fusion, the passage of material through the heating chamber does not ordinarily abstract sufficient heat from this body of fusible material to lower it below its melting point. In this way, the temperature of the molten metal or the like does not drop and, correspondingly, the temperature of the wall of the injection cylinder and the temperature to which the plastic is heated, remains constant despite the abstraction of heat by the granular plastic. The large volume of melted metal or the like at its melting point acts as a large reserve of heat from which heat may be abstracted intermittently without fluctuation in the actual temperature, advantage being taken of the phenomenon that the temperature of melting or of transition remains constant as long as the solid and the liquid phase are in intermixture. In this way, the present invention enables a reduction in fluctuation of temperature in the heating chamber to a negligible figure.

If desired, I may provide suitable means for preventing the electric heating element from heating the molten metal or the like above its fusion or transition point and for similarly preventing the molten metal from dropping below its melting point, thus insuring that a mixture of solid and molten metal is at all times present. Preferably, this mixture should be in such a state that the application of only a small amount of heat will convert it entirely to the molten form, thereby providing the maximum reserve of heat in the metal without allowing it to rise above the melting point. However, under certain circumstances, the metal may be allowed to rise above its melting point slightly, since the specific heat of the metal will usually be very small compared to the latent heat of fusion and, therefore, the passage of plastic through the heating chamber would soon lower the temperature to the melting point without doing undue damage. The means for insuring that the metal or the like remains at the fusion or transition point may take any suitable form. For example, it might comprise a small portion of the fusible metal separated from the main body of the metal and adapted to more readily respond to the abstraction of heat by the passage of plastic through the heating chamber. A pyrometer or thermostat is connected to this separate portion in such manner that either the operator may manually or the thermostat may automatically apply the electric current to the heating element to an extent directly proportional to the drop in temperature of the separate portion of fusible metal, thereby preventing the temperature of the main body of fusible metal from dropping below the melting point. This means may take any other form of device for maintaining a fusible material at the stage where it comprises both the solid and the fused material in intermixture and preferably at the point where almost all of the solid material has been converted to the molten form.

The accompanying drawings portray several methods of carrying out the invention. Referring first to Figure 1, reference numeral 1 designates the injection cylinder of an injection molding machine, in which reciprocates the injection plunger 2. The injection cylinder is provided with a screwed-in injection nozzle 3 and with a material spreader or torpedo 4, and is adapted to inject the fluent material into the mold cavity 5 formed by the cooperating mold halves 6 and 7, mold half 7 being stationary and mold half 6 being clamped thereto by means of the hydraulic motor 8. Surrounding the injection cylinder 1 is a jacket 9 of any suitable type adapted to retain the molten metal or the like and preferably constructed with a highly heat conductive cylindrical wall in order that the heat of the heating element may be readily transferred to the metal 10 or the like interposed between the jacket 9 and the exterior of the injection cylinder 1. Surrounding the jacket 9 and in intimate contact therewith is an electrical heating element 11 around which is disposed the heat insulating material 13. The electrical current is supplied to the heating element 11 by the power lines 14 and 15, a rheostat 16 being interposed, if desired, in the lead 15. The temperature to which the metal 10 is heated and the application of electric current to heating element 11 may be indicated and controlled by the instrument 17 having the heat sensitive element 18 disposed at a suitable point in the bath material. The instrument 17 is an ordinary commercially available indicator and thermostatic control and is adapted to maintain the temperature of the metal 10 at the temperature to which instrument 17 is adjusted.

In Figure 1, the mold halves 6 and 7 are cored and are adapted to have a heated liquid circulated therethrough by means of inlet pipe 19 and outlet pipe 20. When operating with thermoplastic materials, the mold halves 6 and 7 may be maintained at a temperature below the setting point of the plastic. When operating with thermo-setting materials, they may be maintained at a temperature above the critical temperature of the resin and will thus cause the resin to assume its infusible form after the expiration of the necessary interval.

In Figure 2 of the drawings, the general arrangement is similar to that of Fig. 1 except that a series of separate zones for heating are employed, a fusible or like material being used in each zone which has a melting or phase conversion point corresponding to a temperature desired to be maintained in that zone. The zones 10a, 10b and 10c are separated by partitions 21. The individual heating elements 11a, 11b and 11c may be controlled manually, if desired, by the variable resistance 16a, 16b and 16c, electric current being supplied as before by lines 14 and 15. It is preferable, however, to control the application of current to the heating elements by means of the control instruments 17a, 17b and 17c, as before. The materials 10a, 10b and 10c for the baths are selected with a view to having their melting or phase conversion points correspond to the temperatures to be maintained in the zones of the injection cylinder, or the temperatures maintained in the baths may be selected with a view to obtaining the desired heat transfer. For example, it may be desired to maintain around zone A a relatively low temperature in order to prevent softening of the plastic in this zone, a somewhat higher temperature around zone B in order to begin the softening of the plastic, and a still higher temperature around the forwardmost zone C so as to render the plastic completely fluent, this last temperature being, however, below the critical setting point of the thermo-setting resin being injected. Or it might be desirable to use a high temperature around zone A in order to obtain very rapid transfer of heat to the plastic material and to use a relatively low temperature around zones B and C in order to convert the material to fluent form but to prevent burning of the material, the temperature in the final zone C being optionally just under the critical setting point of the resin. When injecting thermo-setting materials with the arrangement of Figure 2, the mold halves 6 and 7 are heated to a temperature above the critical temperature of the resin by means of electric heating elements 22 or by the circulation of a heated fluid as in Figure 1.

Instead of surrounding the fusion bath with the electric heating element as shown in Figs. 1 and 2, a rod-like commercially available heating element may be spirally wound around the injection cylinder 1 within the material of the bath. An example of such a heater is the ordinary commercially available "Calrod" immersion heater manufactured by the General Electric Company. By using such an immersion heater, particularly in conjunction with the use of a metal as the bath material, a perfect contact is obtained between the heater and the bath, whereby heat losses are minimized and rapid heating is assured.

It will be seen from the foregoing that the use of a bath 10 eliminates the necessity for a circulating pump for circulating the heated material heretofore employed and prevents local overheating of portions of the injection cylinder. In addition, it enables the maintenance of an exactly predetermined temperature of the bath and a corresponding temperature of the plastic material. Where the materials employed for the bath are good heat conductors, such as molten metal or fused salts, a better contact is obtained with the wall of the injection cylinder and with the surface of the heating element, thereby resulting in faster and more uniform heating of the plastic. Instead of using conducted heat for heating the bath, I may use induced heat, arranging the bath to act as the low tension winding of a transformer and effecting heating inductively with eddy currents of high frequency. For the higher temperature ranges, I may use molten metals or fused salts, whereas for the lower temperature ranges, I may use the transformation temperatures of crystalline hydrates, such as, for example, copper sulphate at 110° C., barium chloride at 100° C., barium hydroxide at 78° C., sodium sulphate at 32° C., manganese chloride at 58° C., trisodium phosphate at 73° C., sodium bromide at 51° C., sodium carbonate at 35° C. and sodium thiosulphate at 48° C. It will be further understood that the plastic in most cases never attains the temperature of the jacket, but stays below the temperature of the jacket, the temperature difference being determined by the particular plastic, the particular speed of operation, and the particular die employed, the temperature of the jacket being predetermined by experiments conducted before the actual injection process, and once having been determined, being maintained at the temperature of change of phase as long as the particular conditions are utilized.

Instead of maintaining the temperature at the change of phase in the case of fusible materials, I may, under certain circumstances carry it above the fusing point and use an ordinary thermostatic control to maintain it at approximately the desired temperature. For example, in the case of an alloy melting at 90° C., I may operate with this alloy maintained at a temperature of substantially 100° C., or higher, if desired. In such a case, I prefer to use a highly heat conductive material for the bath, such as metal or fused salt in order to attain the advantages of better heat conduction thereby as compared with the hot oil which has been heretofore commonly employed.

Referring now to the modification shown in Figure 3, the general construction is the same as that heretofore described, except that a spiral rod-like heating element 23 is wound around the injection cylinder 1 and is within the material of the bath, and this heating element is controlled by the state of the material of the bath. The bath material 24 is carried within a suitable jacket 25 surrounded by heat insulation 26. The material of the bath is such that it will not conduct electricity when solid but will conduct electricity upon the change of phase, such as upon becoming molten. For example, the bath material may be a fused salt such as the salts enumerated above, the salt being selected which has the desired melting point and electrical conducting properties when molten and when solid. Instead of using a fused bath, I may, under certain circumstances, employ a crystalline hydrate at the temperature at which it loses water. In such case, the material below the transition temperature will not conduct electricity but above the transition temperature will conduct electricity. In order to insure that the bath material 24 is maintained at the melting point or the like, I provide a pair of electrical contacts 27 which are adapted to be electrically connected when the bath material therebetween becomes molten and to thereby allow electrical current to flow through the secondary of transformer 29 and through the winding 28 of solenoid 30, thereby opening switch 31 and opening the electrical circuit to heating element 23 which is normally established by reason of a spring normally holding switch 31 in closed position, the incoming power lines being designated as 32. The contacts 27 are well removed from heater element 23 so that a large portion of bath material 24 is in molten form before the circuit is established across contacts 27. In this way, a large reserve of latent heat of fusion is available for heating the plastic in the injection cylinder. When switch 31 is opened, the supply of electricity to heater element 23 is cut off and solidification of the bath material in the region of contacts 27 may occur by reason of the loss of heat from the bath by radiation or by extraction thereof by the plastic material. By using the apparatus of Fig. 3, the necessity for using an expensive thermostat is eliminated, the bath itself being employed to control the application of electrical energy and thereby to maintain the bath at the temperature of conversion and at a point where the major portion of the bath is in the converted state.

In Figure 4, there is shown an apparatus wherein the same general arrangement is employed as in Figure 3, except that the necessity for employing a material which is an electrical conductor when converted but a non-conductor when in the solid state, is eliminated, and wherein a different method of maintaining the bath at the temperature of conversion is employed. In this embodiment, a molten metal bath may be employed as well as any of the materials which would be suitable for use in the apparatus of Figure 3. The bath is divided into two portions, a main portion 33 and a relatively small control portion 34 which is disposed around a rear portion of injection cylinder 1, these portions 33 and 34 being separated by a partition 35. A heater element 23 is employed as in Fig. 3, with the major portion thereof disposed in the main portion 33 of the bath and with a proportionately larger portion in the control section 34. For example, there is illustrated the use of one and one-half turns of the spiral heating element in control section 34, whereas the spacing of the turns in the main portion 33 is such that only one turn is used in a portion of bath 33 corresponding in length and size to control bath 34. A thermostat 36 is provided having a sensitive element 37 disposed in the control bath 34 at a considerable distance from the heating element 23, and this thermostat 36 is adapted to actuate a snap switch 38 disposed in one of the incoming power lines 32 and to thereby cut off the application of heat to heater 23 when a predetermined temperature in the control bath 34 has been reached. Thermostat 36 need not be extremely sensitive and, therefore, need not be unduly expensive, it being satisfactory if thermostat 36 is responsive to temperature changes of the order of 3° or 4° F. Thermostat 36 is adjusted so as to maintain the temperature in control portion 34 at 3° or 4° above the melting point of the bath material. For example, if thermostat 36 is accurate to within 3° plus or minus, it may be set to operate at a temperature of say 4° above the melting point of the bath material. Due to the fact that thermostat 36 is set to operate at a temperature slightly above the melting point and to the fact that the proportionate heat applied to the control portion 34 is greater than that to the main portion 33, the result will be that the main bath 33 will be maintained at the melting temperature and at a point where it is practically all in the molten or converted form. The maintenance of control bath 34 at a higher temperature is not harmful because the plastic at the rear of the injection cylinder is granular and is not capable of being injured by the excessive temperature at this point, although the subjection of the fluent plastic to such a temperature might convert it to the infusible form. From the foregoing, it will be seen that the arrangement of Fig. 4 provides a simple and inexpensive means of maintaining the main body of the bath at the conversion temperature.

Referring to the modification shown in Fig. 5, the bath comprises material which expands upon becoming molten, such as suitable known metals having this characteristic, and this expansion is employed to break the circuit to the electric heating element when the entire body of metal or the like has become molten. The bath material 40 is heated by electrical heating element 41 which is generally of the type described in copending application of I. B. Lawyer, Serial No. 231,637, filed September 26, 1938, and is adapted to cause convection circulation of the material of the bath and to thereby eliminate local overheating. As the material of the bath becomes molten, it urges outwardly a plunger 42 which is normally spring pressed inwardly and which operates within a cylinder 43 mounted in the wall of the jacket. When plunger 42 moves outwardly due to the expansion of the metal or the like, it opens a snap switch 44 disposed in one of the power lines 32 leading to the heater 41, cutting off the supply of electrical current and allowing the bath 40 to remain at its molten temperature and preventing it from being heated above the temperature of melting. As heat is abstracted from bath 40, the bath shrinks and plunger 42 is spring-pressed inwardly, causing snap switch 44 to close, thus again energizing heater 41 and causing the temperature of the bath 40 to rise. By disposing the plunger 42 at the top of the bath and at a point well removed from heater element 41, it is insured that a large portion of the bath 40 is in molten form before the electric current is cut off to heater 41. Thus, by taking advantage of the property of the bath material of expanding upon change of state to the molten form, I am enabled to maintain the temperature of the bath at the melting point and near that point where it is all molten but without raising its temperature above the melting point, without the use of an expensive thermostat.

In Figures 3 and 4, an expansion space 39 is provided above the bath to allow for expansion thereof upon heating.

From the foregoing description, it will be seen that I have devised an inexpensive and effective method and apparatus for heating a plastic to a constant temperature, this method and apparatus being particularly applicable to the injection molding of thermo-setting materials which are exceedingly susceptible to small increases in temperature over a critical temperature, although the invention may equally be applied to thermoplastic materials where constant conditions of operation are desired. These results are accomplished in a preferred form by the maintenance of a bath in direct heat conducting relationship with the injection cylinder, this bath being maintained at the constant temperature at which it undergoes a change of phase from the solid state. I consider that invention resides not only in the method and apparatus for injection molding, but also in the particular controlling means of Fig. 3, for example. It will be seen that I have devised mechanism which not only maintains the bath material at the temperature of change of phase, but which maintains it at a point where the change of phase is almost entirely complete, so that the large reserve of heat attendant upon extensive change of phase is available at a constant temperature to heat the plastic.

The process may be carried out by heating the granular or powdered thermo-setting plastic in the injection cylinder to a suitable low temperature at which it retains its granular form, and injecting it under extremely high pressure into the mold while it retains its granular form, the temperature to which the mold is heated and the pressure to which the granular material is subjected by the injection plunger after it is in the mold, being sufficiently high to cause the material to flow into a homogeneous form and to subsequently set. In the case of granular thermoplastic materials the mold is heated sufficiently and the injection pressure exerted on the granular plastic in the mold is such as to cause the granular material in the mold to flow to take the shape of the article after which the mold cools or is cooled to harden the article.

The granular thermo-setting plastic may be preheated in the injection cylinder to a temperature at which it is sufficiently soft to be injected (say 60° to 90° C.) under the usual injection pressures and then injected into the mold while it retains its unreacted state, the mold being heated as before to a temperature above the critical temperature of the resin and supplied with sufficient heat at the temperature to set the article.

I wish it to be understood that I intend to include as within my invention such modifications and adaptations thereof as may be necessary to make it suitable for varying conditions and uses and as fall within the scope of the appended claims.

Having thus fully described my invention, what I claim as new and desire to secure by Letters Patent is:

1. The process of injection molding which consists of passing plastic material through a zone heated by a body of metal maintained at the melting point thereof, and of heating the plastic material while passing through said zone by absorption of heat solely from the body of latent heat in the metal while at melting temperature or in transition from the molten state to the solid state.

2. The process of injection molding which consists of heating a plastic injection chamber by surrounding the same with a body of metal maintained at the melting temperature thereof, and of heating the plastic material during its passage through the chamber by moving the plastic material through the chamber at a rate that the temperature of the material is elevated to a molding temperature below the melting temperature of the metal solely by the absorption of heat from the latent heat reserve in the body of molten metal.

3. The process of injection molding which consists of heating a plastic injection chamber by surrounding the same with a body of metal maintained at the melting temperature thereof, of heating the plastic material during its passage through the chamber by moving the plastic material through the chamber at a rate that the temperature of the material is elevated to a molding temperature below the melting temperature of the metal solely by the absorption of heat from the latent heat reserve in the body of molten metal, and of regulating the temperature of the body of metal to maintain substantially the entire body at the melting temperature thereof.

4. The process of injection molding which consists of heating a plastic injection chamber by surrounding the same with a principal body of metal for heating the chamber and a control body of the same metal both of which are maintained at the melting temperature of the metal, of heating the plastic material during its passage through the chamber by moving the plastic material through the chamber at a rate that the temperature of the material is elevated to a molding temperature below the melting temperature of the metal solely by the absorption of heat from the latent heat reserve in the principal and control bodies of molten metal, and of regulating the temperature of the principal body of metal to retain the same at melting temperature by the fusion temperature of the control body, to maintain substantially the entire body at the transition temperature thereof.

5. The process of injection molding which consists of heating a plastic injection chamber by surrounding the same with a body of metal maintained at the melting temperature thereof, of heating the plastic material during its passage through the chamber by moving the plastic material through the chamber at a rate that the temperature of the material is elevated to a molding temperature below the melting temperature of the metal solely by the absorption of heat from the latent heat reserve in the body of molten metal, and of regulating the temperature of the body of metal by a change in fluid level thereof produced by the transition of a portion of the molten metal to the said solid state to maintain substantially the entire body at the melting temperature thereof.

6. In an injection molding machine, a heating chamber for plastic material, a fluid body in thermal contact with said chamber for heating the same comprising a body of metal at the melting temperature thereof, means for heating said body of metal, and means responsive to the temperature of said body for controlling the operation of said heating means to maintain the said body at the melting temperature thereof.

7. In an injection molding machine, a heating chamber for plastic material, a fluid body in thermal contact with said chamber for heating the same comprising a body of metal at the melting temperature thereof, and means responsive to a change in the fluid level of said body caused by solidification of a portion of said body for controlling the temperature of the body to maintain the same at melting temperature.

8. In an injection molding machine, a principal heating chamber for plastic material, a principal fluid body in thermal contact with said chamber for heating the same comprising a body of metal at the melting temperature thereof, a control body of metal in thermal contact with said chamber, means for heating said principal body and said control body to melt the same, and means responsive to the fusion temperature of the control body for maintaining the temperature of the principal body at the melting temperature thereof.

9. An injection molding machine comprising a heating chamber for plastic material, a chamber surrounding said heating chamber, a molten metal in said second mentioned chamber, means separating said molten metal in said second mentioned chamber into a plurality of independent bodies, heating means for maintaining said bodies in molten condition, and independent means for controlling said heating means to maintain the temperature of said independent bodies.

10. An injection molding machine comprising a heating chamber for plastic material, a chamber surrounding said heating chamber, a molten metal in said second mentioned chamber, means separating said molten metal in said second mentioned chamber into a plurality of independent bodies, heating means for maintaining said bodies in molten condition, and independent means for controlling said heating means to maintain said independent bodies at different temperatures.

11. An injection molding machine comprising a heating chamber for plastic material, a chamber surrounding said heating chamber, means partitioning said last mentioned chamber into a plurality of compartments, a molten metal in each of said compartments, each of said metals having a different melting point, independent heating means for each of the bodies of molten metal, and independent means for controlling said independent heating means to maintain the independent metal bodies at their respective melting points.

WARREN R. TUCKER.